United States Patent [19]

Torossian et al.

[11] Patent Number: 4,631,230
[45] Date of Patent: Dec. 23, 1986

[54] UNIQUE EPOXY RESIN COMPOSITIONS AND COMPOSITE MOLDED BODIES FILLED THEREWITH

[75] Inventors: Kevork A. Torossian; Mark Markovitz, both of Schenectady; Frederick E. Cox, Gloversville, all of N.Y.

[73] Assignee: General Electric Company, Schenectady, N.Y.

[21] Appl. No.: 595,599

[22] Filed: Apr. 2, 1984

[51] Int. Cl.$^4$ .............................................. B32B 27/36
[52] U.S. Cl. ...................................... 428/412; 428/413; 428/416; 528/103; 528/411; 525/524; 525/481; 525/501
[58] Field of Search ............... 428/412, 416, 413; 528/103, 92, 104, 411; 525/524, 481, 501

[56] References Cited

U.S. PATENT DOCUMENTS

| | | |
|---|---|---|
| 3,567,677 | 3/1971 | Webb et al. |
| 3,776,978 | 12/1973 | Markovitz ............................. 428/416 |
| 3,928,708 | 12/1975 | Fohlen et al. ........................ 428/412 |
| 3,955,697 | 5/1976 | Valyi ..................................... 428/412 |
| 4,360,649 | 11/1982 | Kamio et al. ......................... 528/123 |
| 4,405,679 | 9/1983 | Fujioka et al. ....................... 428/412 |
| 4,532,308 | 7/1985 | Sato et al. ............................ 528/103 |

*Primary Examiner*—Edith Buffalow
*Attorney, Agent, or Firm*—Jerome C. Squillaro

[57] ABSTRACT

A thermosetting resin composition of an epoxy resin mixture of 1,2 epoxy resin having at least two epoxide groups per molecule and a polyglycol diepoxide having viscosity of 2,000-5,000 centipoises at 25° C. and in addition small but effective amounts of both a catalytic hardener and an accelerator has special utility in the production of composite molded bodies of electrical insulation having thermoplastic shells because of its unique combination of properties including thermal stability, thermal-cycling crack resistance, high impact strength, toughness, room-temperature curability and bondability to both thermoplastic and metallic surfaces, and because it does not stress crack thermoplastic shells to which it is bonded in curing.

7 Claims, 3 Drawing Figures

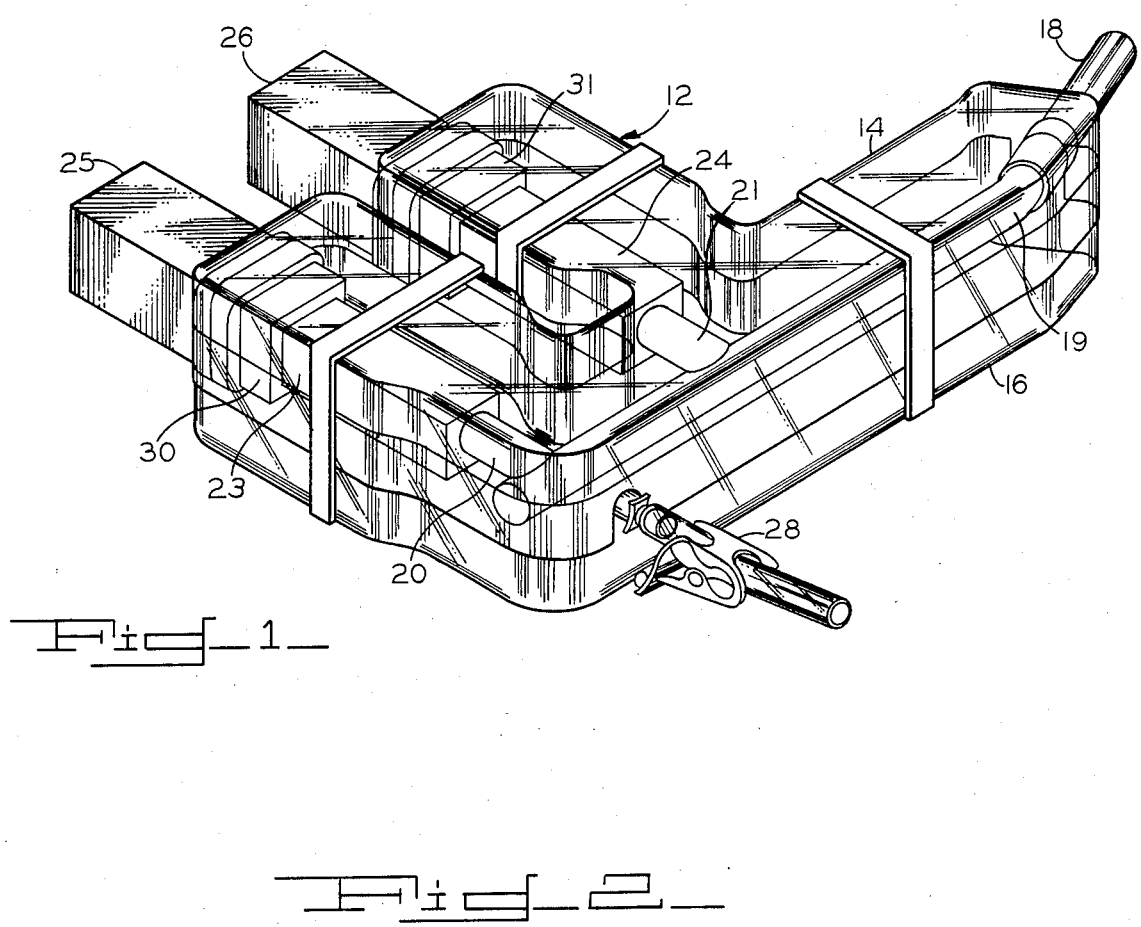
Fig-1-
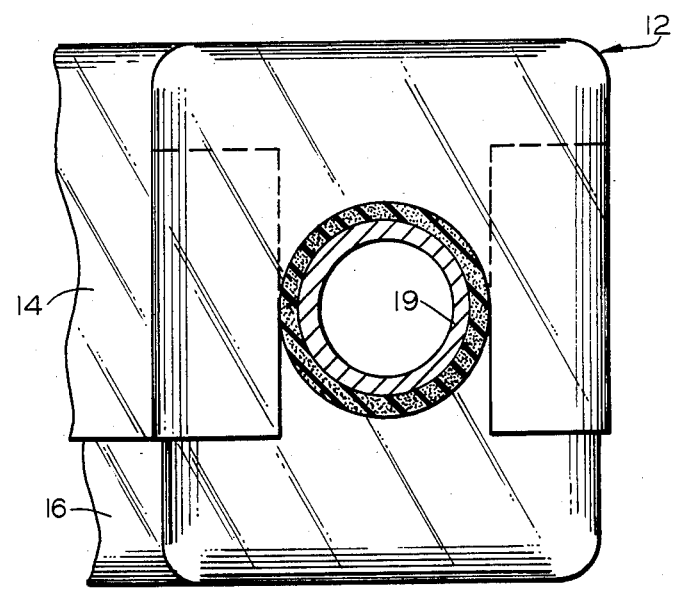
Fig-2-

UNIQUE EPOXY RESIN COMPOSITIONS AND COMPOSITE MOLDED BODIES FILLED THEREWITH

FIELD OF THE INVENTION

The present invention relates generally to epoxy resin technology and is more particularly concerned with novel epoxy resin compositions having special utility in the production of composite molded bodies of electrical insulation because of their unique characteristics, and with new composite molded bodies comprising thermoplastic resin shells filled with and bonded to materials of those novel compositions.

CROSS REFERENCE

This invention is related to that of copending patent application Ser. No. 595,596 filed of even date herewith in the names of Torossian, Heisler and Cox and assigned to the assignee hereof, which discloses and claims a novel conductor insulating method and resulting composite article and an unique clamshell mold having special utility in implementation of that method.

BACKGROUND OF THE INVENTION

THE long-standing, generally recognized need for a better way to provide insulation for conductors such as the series loops of the stators of large, fluid-cooled, electric generators was finally met by the invention of the above-referenced patent application. Thus the difficulty and high labor cost of the standard manual taping and patching procedure of the prior art can be avoided and the shortcomings and derelictions of the potting and casting attempts of the prior art can be overcome by applying the principles of that invention. In essence, according to those principles a composite body of insulating material is formed over the exposed part of a series loop by enclosing that part in a clamshell mold of thermoplastic resin insulating material, then filling the mold with thermosetting resin insulating material and curing the latter and thereby bonding it to both the shell and the exposed part of the series loop. By virtue of the fact that two half shells of the clamshell mold are formed for adjustable interfitting engagement of their overlapped opposed edge portions the mold can be easily assembled and secured in place around the part of a series loop to be insulated. Then the thermosetting resin material can be injected into the mold and cured at room temperature to bond the resulting integral composite body of mold and fill to the exposed part of the conductor to be insulated. The thermosetting resin material thus on curing bonds well to both the thermoplastic mold and to the metallic conductor and in addition to having requisite dielectric strength has good shelf life, flowability enabling complete filling of the mold under moderate pressure, and in cured form is resistant to cracking on accelerated thermal cycling tests.

SUMMARY OF THE INVENTION

We have discovered that the service life of these new composite insulating bodies can be substantially increased, making the invention of patent application Ser. No. 595,596 of even greater importance as an advance in this old, well-developed technological field. Further, we have been able to make this gain without incurring any significant offsetting disadvantage of cost or compromise of any desirable feature or property of the ultimate product.

A key discovery of ours upon which this invention is predicated is that epoxy resin compositions which are generally well qualified for use as fill or molding compositions because of their superior adhesive properties, thermal stability, resistance to solvents, oils and water, and their dielectric strengths, can be modified so that they do not tend to generate cracks in composite molded bodies leading to insulation breakdown. In particular we have found that stress cracking of the thermoplastic mold by the epoxy resin fill and thermal-cycle cracking of the epoxy resin fill itself can be avoided while the impact strength of the fill and of the ultimate composite body is substantially increased by incorporating certain polyglycol diepoxides in critical proportions in epoxy resin compositions such as those disclosed in the above-referenced patent application. Specifically, polyglycol diepoxides having viscosity of at least 2,000 centipoises (cps) at 25° C. when used in proportion to the epoxy resin of about 1-3 to 3-1 have been found to be effective in this manner and with these results. Further, additions of glycidyl ether of an aliphatic alcohol having 8 or more carbon atoms have been found effective to modify the viscosity of the epoxy resin molding compositions without causing subsequent stress cracking of the thermoplastic mold even when it is of polycarbonate resin. These results are unexpected because other polyglycol diepoxides and glycidyl ethers of phenol, butanol and neopentyl glycol used in the same manner cause stress cracking of polycarbonate resin shells.

In making additions of glycidyl ethers to reduce viscosity and thus improve flow characteristics of the epoxy resin molding compositions, the amounts used should be between about five and 25% on the basis of the epoxy resin mixture. Preferably the aliphatic alcohol of the glycidyl ether is one having from 8-14 carbon atoms in the molecule.

The compositions of this invention also contain a phenolic accelerator and an organic titanate having only titanium-to-oxygen primary valence bonds. These latter two constituents are in small but effective amounts being respectively from about 0.1-15% and 0.5-10% on the basis of the epoxy resin mixture. In other words the cure chemistry of the molding compositions of this invention is based upon the invention disclosed and claimed in U.S. Pat. No. 3,776,978 issued Dec. 4, 1973 to Mark Markovitz and assigned to the assignee hereof. Thus the proportions of phenolic accelerator and organic titanate stated above are based upon the total epoxy resin content of the molding composition in each case so that, for instance, when two epoxy resin formulations are combined as described below, the amounts of phenolic accelerator and organic titanate in the ultimate mixture will be within the above ranges.

A new composite molded body of this invention produced through the use of one of these novel epoxy resin compositions by the method disclosed and claimed in reference patent application Ser. No. 595,596 comprises a shell of thermoplastic material filled with the epoxy resin composition in cured form bonded to the shell. In typical use the composite body itself is bonded by the cured resin composition to a conductor which is thereby electrically insulated. Thus as applied to the exposed portion of a series loop of the stator of a large electric generator, the shell is a clamshell mold of two half shells disposed around and enclosing the exposed part of the metallic body to be insulated. With the half shells sealed tightly together, the mold cavity is filled completely with a resin composition of the present invention which is then cured in situ and thereby firmly bonded to both the mold shell and enclosed conductor portion. As disclosed also in the aforesaid referenced patent application, the thermoplastic mold shell may be of one or another of several different thermoplastic materials such as bisphenol-A polycarbonates such as General Electric Company's Lexan ® resin, or polyester material such as made from 1,4-butanediol and terephthalic acid such as General Electric Company's Valox ® resin, Celanese Company's Celanex TM or Eastman Kodak's Kodapax TM, or polysulfones, polyetherimides, and the like. In other words, all these thermoplastic materials are eligible for such use and can be expected to produce consistently good results as described above when applied and used in accordance with the teachings of this invention as set out herein.

In its composition of matter aspect the present invention, generally described, is an epoxy resin mixture of 25-75% of 1,2 epoxy resin having at least two epoxide groups per molecule and 75-25% of a polyglycol diepoxide having viscosity from 2,000-5,000 cps and in addition small but effective amounts both a phenolic accelerator and a catalytic hardener. As an additional constituent for purposes of improving flowability through adjustment of viscosity, a glycidyl ether of an aliphatic alcohol having from 8-14 carbon atoms per molecule may be incorporated in the resin composition. Further this latter optional constituent may be used as an admixture of two or more such ethers. Our preference, in fact, is to use the glycidyl ether of a mixture of 8-10 carbon atom alcohols or of 12-14 carbon atom alcohols.

BRIEF DESCRIPTION OF THE DRAWINGS

A further and better understanding of this invention and the new results and advantages which it affords will be gained by those skilled in the art upon consideration of the detailed description of preferred embodiments illustrated by the drawings accompanying and forming a part of this specification, in which, FIG. 1 is a view in perspective of a clamshell mold assembled with an installed stator series loop so as to enclose the portions of the loop, stator bars and ground insulation to be insulated or covered by a thermosetting resin composition of this invention filling the mold chamber or cavity;

DETAILED DESCRIPTION OF THE INVENTION

Figure 2:
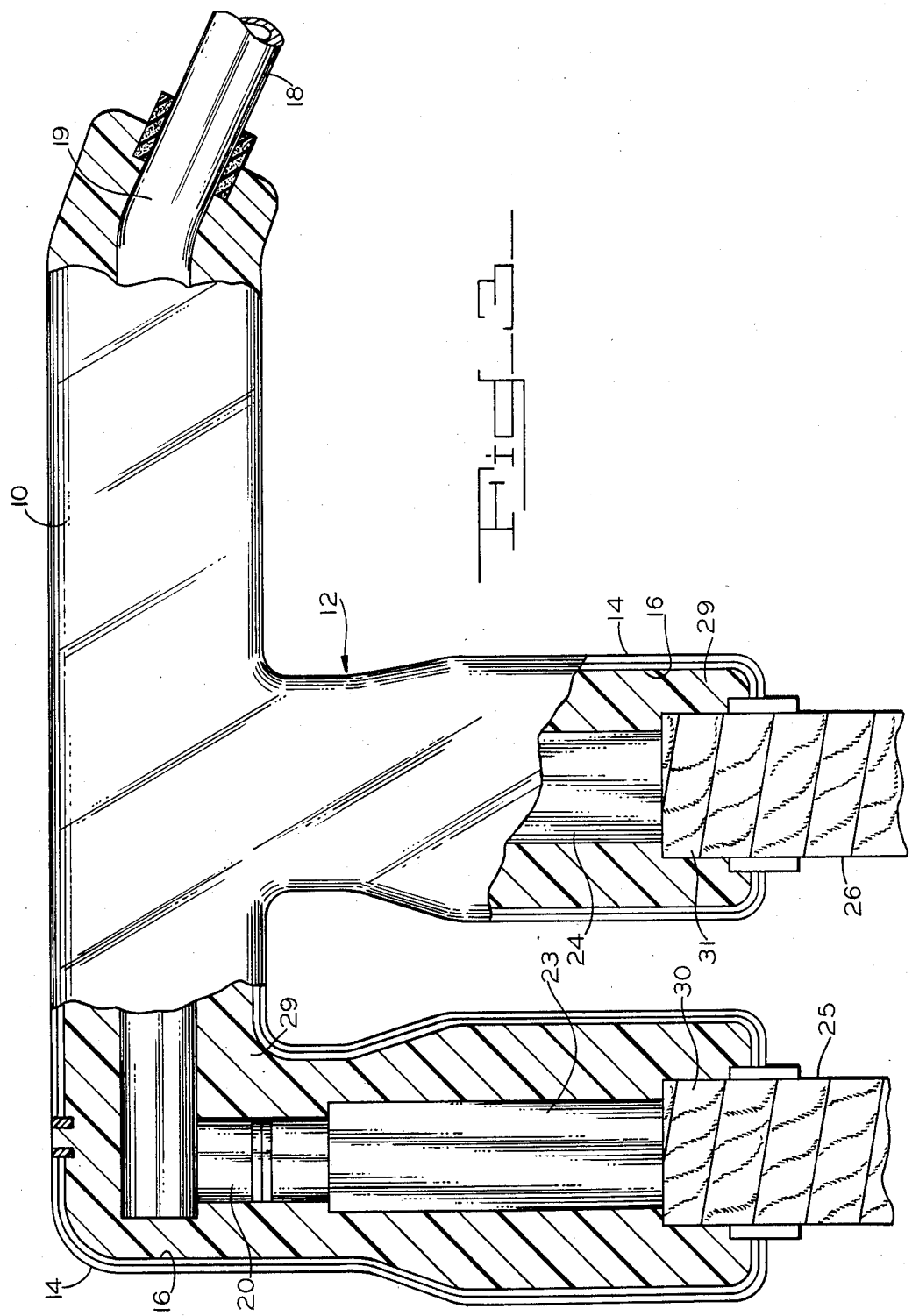
FIG. 2 is a fragmentary elevational view of an extremity of the mold of FIG. 1 showing the series loop liquid-coolant line and sponge elastomeric material seal therefor; and, FIG. 3 is a side-elevational view of the mold of FIG. 1 filled with the resin composition of this invention cured and bonded to the mold shell, the series loop components and stator bar end portions within the mold chamber, parts being broken away for clarity.

As shown in the drawings, a composite molded body 10 (FIG. 3) of a preferred form of this invention comprises a thermoplastic mold 12 (FIG. 1), suitably a clamshell consisting of two half shells 14 and 16 secured together with their edges interfittingly overlapped and sealed. Further, mold 12 is so designed and constructed of polycarbonate resin that it can be readily applied to and installed on a series loop 18 of a stator of a large electric generator to enclose in the cavity of the mold parts 19, 20 and 21 of the series loop to be electrically insulated, as well as ends 23 and 24 of stator bars 25 and 26, respectively. With the mold thus assembled and applied as disclosed and described in detail in above-referenced copending patent application (the substance of which pertaining to the structure, design and method of use of the mold are hereby incorporated herein by reference), a novel composition of the present invention is introduced under pressure into the mold through sprue sub-assembly 28 to fill the mold cavity. That composition is then cured at room temperature in situ in contact with the interior surface of the mold and with the parts of the series loop and associated stator bars enclosed in the mold to provide a bonded composite insulating structure which is also bonded to the series loop and the stator bar portions as illustrated in the drawing. Cured resin fill body 29 (FIG. 3) thus covers completely series loop parts 19, 20 and 21 and stator bar end portions 23 and 24 including parts thereof wrapped with ground insulation as shown at 30 and 31.

In using a novel room-temperature gelling or curing composition of this invention one has a choice between one-part and two-part resin systems. The former as a catalyzed molding compound is flash frozen to preserve its stability and then at the time of use is rapidly heated, for example, by microwave radiation, to convert it to liquid or flowable form in which it can be injected into the mold through sprue sub-assembly 28. The alternative is to mix the two reactive constituents (resin component A and resin component B) just prior to introducing the composition into the mold.

A preferred epoxy molding composition is one in which Part A and Part B can be used in about 1.0 to 1.0 ratio for optimum properties of the cured insulation product. There is however, substantial latitude in these proportions in the practice of this invention, as indicated above and set out in more detail below.

A number of experiments have been performed in exploring the parameters of this invention. Thus in some of the illustrative, but not limiting, examples set forth below the criticality of the molecular carbon content of the aliphatic alcohol of glycidyl ether in terms of stress cracking of the polycarbonate mold shell is demonstrated. Also in some examples, the substantial variation from preferred 1.0 to 1.0 ratio of Parts A and B that is possible without major detrimental effect upon the performance of the molding composition or compound is established.

EXAMPLE 1

A two-part resin system was made in a proportion of 1.0 to 1.0 ratio consisting of the following as Part A:

|  | Parts by Weight (pbw) |
|---|---|
| Epon 828 (bisphenol-A diglycidyl ether resin) | 25.5 |
| Catechol | 1.54 |
| Cab-O-Sil TS 200 (fumed silica) | 1.0 |
| Min-U-Sil 30 (30-micron silica) | 9.49 |
| 1/32" glass fibers | 11.63 |
| ⅛" glass fibers | 0.85 | and Part B:

| | Parts by Weight |
|---|---|
| Epon 828 (bisphenol-A diglycidyl ether epoxy resin) | 25.5 |
| Tetraoctylene glycol titanate | 1.54 |
| Cab-O-Sil TS 200 (fumed silica) | 1.0 |
| Min-U-Sil 30 (30-micron silica) | 9.49 |
| 1/32" glass fibers | 11.63 |
| ⅛" glass fibers | 0.85 |

Under accelerated conditions of thermal cycling described below, specimens of the resulting cured resin body failed the test by forming cracks.

In the foregoing experimental test, thermal crack resistance, or more exactly, thermal shock crack resistance, was measured by filling a cylindrical mold made from a 1.0 inch by 1.0 inch square and an 8-inch long steel bar which was centered inside a ⅛th -inch thick, 2.0-inch inside diameter and 8-inch long Plexiglas® resin tube. The sharp corners of the steel bar act as stress risers. The molding compound under test was cured 24 hours at room temperature followed by 24 hours at 105° C. post cure. The 8-inch long sample was cut into four 1½-inch thick slices (one-inch end portions being cut off and discarded) thereby exposing a cross section of the molded resin body with the square steel rod embedded in it. The 1.5-inch high sample in each instance was tested by heating 30 minutes at 130° C. and then immediately dropping it into acetone at −70° C. and keeping the sample emerged 10 minutes at −70° C., the acetone being cooled with liquid nitrogen. The cured resin bodies were classified as passing the thermal shock test when four samples underwent 10 cycles (therefore, a total of 40 test points) without any crack appearing in them.

EXAMPLE 2

Another molding compound was made which was identical to that of Example 1 except that the 25.5 parts by weight of Epon 828 used in Parts A and B was replaced by Epon 828 (16.6 pbw) and polyglycol diepoxide (8.9 pbw) having viscosity of 55–100 cps at 25° C.

Under the same thermocycling test as described in Example 1, the resin product body passed the thermal cycling test but severely stress cracked the polycarbonate shell to which it was bonded on curing.

EXAMPLE 3

Another molding compound prepared as described in Example 1 in a 1.0 to 1.0 ratio of Parts A and B was made consisting of Part A:

| | Parts by Weight |
|---|---|
| Epon 828 (bisphenol-A diglycidyl ether epoxy resin) | 12.65 |
| Polyglycol diepoxide (viscosity 1,350 cps at 25° C.) | 10.35 |
| Catechol | 3.7 |
| Glass beads | 20.3 |
| ⅛" glass fibers | 1.5 |
| 1/32" glass fibers | 1.75 | and Part B: Parts by Weight

| | Parts by Weight |
|---|---|
| Epon 828 (bisphenol-A diglycidyl ether epoxy resin) | 12.65 |
| Polyglycol diepoxide (viscosity 1,350 cps at 25° C.) | 10.35 |
| Tetraoctylene glycol titanate | 1.4 |
| Glass beads | 20.3 |
| ⅛" glass fibers | 1.5 |
| 1/32" glass fibers | 1.75 |

The resulting resin body bonded as in Example 2 to a polycarbonate test shell passed the thermal cycling test described above, but stress cracked the polycarbonate shell.

EXAMPLE 4

Another molding compound was made which was identical to the one described in Example 3, but the polyglycol diepoxide used in Example 3 was replaced by a polyglycol diepoxide having a viscosity of 2,000–5,000 cps at 25° C. The resulting molding compound resin body again bonded on curing to a polycarbonate shell passed the thermocycling test described above and also did not crack the polycarbonate shell.

EXAMPLE 5

Still another 1.0 to 1.0 ratio molding compound of Parts A and B was made consisting of the following Part A:

| | Parts by Weight |
|---|---|
| Epon 826 (bisphenol-A diglycidyl ether epoxy resin) | 10.8 |
| Polyglycol diepoxide (viscosity 2,000–5,000 cps at 25° C.) | 10.8 |
| Butyl glycidyl ether | 2.39 |
| Catechol | 3.9 |
| Cab-O-Sil TS 200 (fumed silica) | 0.80 |
| Min-U-Sil 30 (30-micron silica) | 9.58 |
| 1/32" glass fibers | 11.62 |
| ⅛" glass fibers | 1.35 |

Part B:

| | Parts by Weight |
|---|---|
| Epon 826 (bisphenol-A diglycidyl ether epoxy resin) | 10.8 |
| Polyglycol diepoxide (viscosity 2,000–5,000 cps at 25° C. | 10.8 |
| Butyl glycidyl ether | 2.39 |
| Tetraoctylene glycol titanate | 1.43 |
| Cab-O-Sil TS 200 (fumed silica) | 0.80 |
| Min-U-Sil 30 (30-micron silica) | 9.58 |
| 1/32" glass fibers | 11.62 |
| ⅛" glass fibers | 1.35 |

The butyl glycidyl ether was used to decrease viscosity and improve the flow properties of the compound. The resin body produced on curing of this composition and bonded to the polycarbonate test shell passed the thermal cycling test, but stress cracked the polycarbonate shell.

EXAMPLE 6

Still another molding compound was prepared which is identical to that of Example 5 except that the butyl glycidyl ether was replaced by neopentyl glycol diglycidyl ether. The resulting cured resin body bonded to a carbonate test shell as described above also stress cracked the polycarbonate shell.

EXAMPLE 7

Still another molding compound was made according to the prescription of Example 5, except the butyl glycidyl ether was replaced by phenyl glycidyl ether. Again, upon curing that compound bonded to the polycarbonate test shell stress cracked the polycarbonate shell.

EXAMPLE 8

Again a compound identical to that of Example 5, except for replacement of the butyl glycidyl ether with 2-ethylhexyl glycidyl ether was prepared. That compound cured and bonded to the polycarbonate test shell passed the thermal cycling test and did not crack the polycarbonate shell. It was found upon hardness testing that the resulting resin body in final cured condition has a Shore D hardness of 43 after 24 hours at room temperature. This hardness index increased to 71 after a post cure for 24 hours at 105° C. This ultimate product passed the thermal shock test without any failure and did not stress crack the polycarbonate test sheet material.

EXAMPLE 9

Another compound identical to that of Example 5 except for replacement of the butyl glycidyl ether with the glycidyl ether of a mixture of $C_8$ to $C_{10}$ alcohols was prepared and cured in contact with a polycarbonate test shell. The resulting resin body passed the thermal cycling test and did not stress crack the polycarbonate shell.

EXAMPLE 10

In another experiment involving the use of the composition of Example 5, except for replacement of the butyl glycidyl ether with the glycidyl ether of a mixture of $C_{12}$ to $C_{14}$ alcohols, a resin body was produced on curing in contact with polycarbonate test shell which passed the thermal cycling test and did not crack the polycarbonate shell.

EXAMPLE 11

Using the composition of Example 8, except that Part A was used in the diminished proportion of 0.71 pbw to 1.0 pbw of Part B, the resulting cured body proved to have Shore D hardness after 24 hours at room temperature of 37 which increased to 70.5 after 24 hours at 105° C. post cure. The cured molding compound passed the thermal shock test without any failure and did not stress crack the polycarbonate test sheet material to which it was bonded.

EXAMPLE 12

Again using a molding composition the same as that of Example 8 but for a larger proportion of Part A (1.25 pbw Part A to 1.00 pbw Part B) resulted in a cured resin body of Shore D hardness of 45 after 24 hours at room temperature. That hardness index was increased to 73 after 24 hours at 105° C. post cure. The ultimate cured molding compound passed the thermal shock test without any failure and did not stress crack the polycarbonate test shell.

Wherever in the present specification and in the appended claims amounts, proportions or percentages are stated, reference is to the weight basis unless otherwise expressly noted.

What is claimed is:

1. A composite molded body of electric insulating material comprising a mold shell of thermoplastic resin selected from the group consisting of polycarbonate, polyphenylene oxide, polysulfone and polyethermide, and a cured thermosetting resin composition contained in the shell and in contact therewith and bonded thereto consisting essentially of an epoxy resin mixture of 25–75 of 1,2 epoxy resin having at least two expoxide groups per molecule and 75–25% of a polyglycol diepoxide having viscosity from 2,000–5,000 cps at 25° C. and small but effective amounts of both a phenolic accelerator and a catalytic hardener.

2. The composite molded body of claim 1 in which the thermoplastic resin is polycarbonate and in which the thermosetting resin composition is a mixture of substantially equal amounts of the said epoxy resin and the said polyglycol diepoxide.

3. The composite molded body of claim 1 in which the amount of phenol accelerator is from 0.1–15% on the basis of the epoxy resin mixture and in which the hardener is an organic titanate having only titanium-to-oxygen primary valence bonds and is present in amount between 0.5 and 10% on the basis of the epoxy resin mixture.

4. The composite molded body of claim 1 in which the thermosetting resin composition contains in addition from 5–25% of the glycidyl ether of alcohols having from 8–14 carbon atoms per molecule.

5. The composite molded body of claim 2 in which the thermosetting resin composition contains in addition about 10% on the basis of the epoxy resin mixture of 2-ethylhexyl glycidyl ether.

6. The composite molded body of claim 1 in which the thermosetting resin composition contains in addition from 5–25% on the basis of the epoxy resin mixture of the glycidyl ether of a mixture of $C_8$–$C_{10}$ alcohols.

7. The composite molded body of claim 2 in which the thermosetting resin composition contains in addition about 10% of glycidyl ether of a mixture of $C_{12}$–$C_{14}$ alcohols.

* * * * *